(12) United States Patent
Lesso (10) Patent No.: US 12,360,584 B2
(45) Date of Patent: Jul. 15, 2025

(54) ARTIFICIAL NEURAL NETWORK COMPUTING SYSTEMS

(71) Applicant: Cirrus Logic International Semiconductor Ltd., Edinburgh (GB)

(72) Inventor: John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 1040 days.

(21) Appl. No.: 17/012,664

(22) Filed: Sep. 4, 2020

(65) Prior Publication Data

US 2021/0103819 A1 Apr. 8, 2021

Related U.S. Application Data

(60) Provisional application No. 62/909,348, filed on Oct. 2, 2019.

(51) Int. Cl.
| | |
|---|---|
| *G06N 3/04* | (2023.01) |
| *G06F 1/10* | (2006.01) |
| *G06F 1/324* | (2019.01) |
| *G06F 9/54* | (2006.01) |
| *G06F 18/15* | (2023.01) |
| *G06N 3/082* | (2023.01) |
| *G06N 5/04* | (2023.01) |

(52) U.S. Cl.
CPC ............. *G06F 1/324* (2013.01); *G06F 1/10* (2013.01); *G06F 9/544* (2013.01); *G06F 18/15* (2023.01); *G06N 3/04* (2013.01); *G06N 3/082* (2013.01); *G06N 5/04* (2013.01)

(58) Field of Classification Search
CPC . G06N 3/04; G06N 3/082; G06N 5/04; G06F 1/10; G06F 18/10; G06F 1/324
See application file for complete search history.

(56) References Cited

PUBLICATIONS

Tu, F., Yin, S., Ouyang, P., Tang, S., Liu, L., & Wei, S. (2017). Deep convolutional neural network architecture with reconfigurable computation patterns. IEEE Transactions on Very Large Scale Integration (VLSI) Systems, 25(8), 2220-2233. (Year: 2017).*
Han, S., Liu, X., Mao, H., Pu, J., Pedram, A., Horowitz, M. A., & Dally, W. J. (2016). EIE: Efficient inference engine on compressed deep neural network. ACM SIGARCH Computer Architecture News, 44(3), 243-254. (Year: 2016).*
Karthikeyan, B., Gopal, S., & Venkatesh, S. (2008). Partial discharge pattern classification using composite versions of probabilistic neural network inference engine. Expert Systems with Applications, 34(3), 1938-1947. (Year: 2018).*
Chi, P., Li, S., Xu, C., Zhang, T., Zhao, J., Liu, Y., . . . & Xie, Y. (2016). Prime: A novel processing-in-memory architecture for neural network computation in reram-based main memory. ACM SIGARCH Computer Architecture News, 44(3), 27-39. (Year: 2016).*

(Continued)

*Primary Examiner* — Kamran Afshar
*Assistant Examiner* — Lokesha G Patel
(74) *Attorney, Agent, or Firm* — Jackson Walker L.L.P.

(57) ABSTRACT

The present disclosure relates to an artificial neural network (ANN) computing system comprising: a buffer configured to store data indicative of input data received from an input device; an inference engine operative to process data from the buffer to generate an interest metric for the input data; and a controller. The controller is operative to control a mode of operation of the inference engine according to the interest metric for the input data.

17 Claims, 5 Drawing Sheets

(56) References Cited

PUBLICATIONS

Ghosh, S., & Kristensson, P. O. (2017). Neural networks for text correction and completion in keyboard decoding. arXiv preprint arXiv:1709.06429. (Year: 2017).*

Wang, Y., Deng, J., Fang, Y., Li, H., & Li, X. (2017). Resilience-aware frequency tuning for neural-network-based approximate computing chips. IEEE Transactions on Very Large Scale Integration (VLSI) Systems, 25(10), 2736-2748. (Year: 2017).*

\* cited by examiner

ARTIFICIAL NEURAL NETWORK COMPUTING SYSTEMS

FIELD OF THE INVENTION

The present disclosure relates to the field of artificial neural network computing systems.

BACKGROUND

In simplistic terms, an artificial neural network includes an input layer of nodes or neurons, an output layer of nodes or neurons and, typically, one or more layers (often referred to as "hidden layers") of nodes or neurons intermediate the input layer and the output layer. Each layer is connected to its successor layer by connections between the nodes of the layers, which transfer data from a node of a layer to a node of the successor layer.

Each node or neuron of a layer typically has multiple inputs, and a weight is assigned to each input of each node in a learning or training stage. During this learning or training stage, known training data is supplied to a layer of the neural network and individual neurons of the layer assign weights to their inputs based on the task being performed. By comparing the resultant outputs with the known training data, and repeating over a series of iterations, the neural network learns the optimum weights to assign to the inputs of the neurons for the task being performed.

During subsequent use of the neural network, operational input data is supplied to the input layer of the neural network. Data applied to a neuron of the input layer is weighted according to the weights assigned to the inputs of the neuron—i.e. the neuron applies the weight assigned to each of its inputs to the data received at the respective inputs. The neuron sums the weighted input data and passes it through a non-linear activation function to generate an output data value, which is transmitted to one or more neurons of the next layer of the neural network, which may be an output layer or an intermediate layer. The use of a trained neural network to apply weights to operational input data is known as inference.

Traditionally the training and inference stages have been performed by centralised servers or "in the cloud", receiving inputs from and providing resultant outputs to so-called "edge" devices, e.g. mobile phones, tablet computers, "smart" devices etc. However, increasingly there is a drive to provide neural nets for inference locally in such devices, which may receive trained weights from training processes performed remotely.

In addition, inference systems are increasingly intended for use in always-on applications, e.g. always-on audio monitoring or image processing systems.

Additionally, there is increasing interest in on-device learning, in which an edge device receives a current neural net model from a provider and performs additional training of the received model itself, using data stored locally on the edge device.

The trend towards providing local neural nets and inference systems within edge devices is driving requirements for increased flexibility in such neural networks and inference systems.

SUMMARY

According to a first aspect, the invention provides an artificial neural network (ANN) computing system comprising:

a buffer configured to store data indicative of input data received from an input device;

an inference engine operative to process data from the buffer to generate an interest metric for the input data; and a controller, wherein the controller is operative to control a mode of operation of the inference engine according to the interest metric for the input data.

By controlling the mode of operation of the inference engine according to the interest metric, the ANN computing system of the first aspect can balances the requirements for high performance of an ANN system with low power consumption. The ANN computing system may normally operate in a default low-power, low-performance mode of operation, but may transition to a relatively higher-power, higher performance mode of operation when the interest metric is indicative that the received input data may represent a signal of interest such as a user command.

The controller may be operative to issue a first control signal to adjust the mode of operation of the inference engine if the interest metric exceeds a threshold.

The inference engine may be operable in a first mode of operation and a second mode of operation.

In the first mode of operation the inference engine may be operative to generate the interest metric based on data from the buffer associated with a particular point or period in time.

The controller may be further operative to issue a second control signal to cause the inference engine to process data from the buffer associated with a predetermined period of time, prior to a point or period in time associated with the input data for which the interest metric was generated, if the interest metric exceeds the threshold.

The inference engine may implement a multi-layer artificial neural network. In the first mode of operation the inference engine may be operative to generate the interest metric based on data from the buffer using a subset of the layers of the multi-layer artificial neural network. In the second mode of operation the inference engine may be operative to process data from the buffer using all of the layers of the multi-layer artificial neural network.

The subset of layers may comprise an output layer of the multi-layer artificial neural network.

Alternatively or additionally, the subset of layers may comprise an input layer and/or one or more intermediate layers of the multi-layer artificial neural network.

Additionally or alternatively, the subset of layers may comprise a dedicated interest metric layer of the multi-layer artificial neural network.

Additionally or alternatively, the inference engine may be operative to generate the interest metric by applying an attentional layer to the output of a layer of the multi-layer ANN.

The interest metric may comprise a score associated with or derived from a subset of the data from the buffer.

Alternatively, the interest metric may comprise a statistical measure of an output of a layer of the multi-layer artificial neural network.

The first mode of operation may be a low power mode of operation and the second mode of operation may be a higher power mode of operation.

In the first mode of operation the inference engine may receive a first clock signal at a first frequency. In the second mode of operation the inference engine may receive a second clock signal at a second frequency that is higher than the first clock frequency.

The data indicative of input data received from the input device may comprise data received from the input device.

Alternatively or additionally, the data indicative of input data received from the input device may comprise feature data derived from data received from the input device.

The inference engine may be further operable in one or more intermediate operating modes between the first operating mode and the second operating mode.

The inference engine may be operative, on returning to the first mode of operation, to process data most recently received in the buffer to generate an interest metric for input data accumulated in the buffer while the inference engine was not operating in the first mode.

The inference engine may be operative, on returning to the first mode of operation, to perform a statistical analysis of input data accumulated in the buffer while the inference engine was not operating in the first mode and to process the data to generate an interest metric for the accumulated input data.

Performing a statistical analysis of the input data may comprise one or more of:
calculating a range of the input data;
calculating an average of the input data;
calculating a median of the input data;
calculating a mode of the input data; or
calculating a trimmed mean of the input data.

The inference engine may be operative, on returning to the first mode of operation, to determine the most interesting input data accumulated in the buffer while the inference engine was not operating in the first mode and to process the most interesting data to generate an interest metric for the accumulated input data.

According to a second aspect of the invention there is provided an artificial neural network (ANN) computing system comprising:
a buffer configured to store data indicative of input data received from an input device;
an inference engine operative to process data from the buffer; and
a controller,
wherein the inference engine is operable in a first mode and a second mode, and wherein the controller is operative to control the mode of operation of the inference engine according to an interest metric of the input data.

According to a third aspect of the invention there is provided an artificial neural network (ANN) computing system comprising:
a buffer configured to store data indicative of input data received from an input device;
an inference engine operative to process data from the buffer;
a clock signal generator operative to generate a clock signal for the inference engine; and
a controller,
wherein the controller is operative to control the frequency of the clock signal generated by the clock signal generator according to an interest metric of the input data.

According to a fourth aspect of the invention there is provided an integrated circuit comprising an ANN system according to the first aspect.

According to a fifth aspect of the invention there is provided a device comprising an integrated circuit according to the fourth aspect.

The device may be a mobile telephone, a tablet or laptop computer or an Internet of Things (IoT) device, for example.

BRIEF DESCRIPTION OF THE DRAWINGS

Embodiments of the invention will now be described, strictly by way of example only, with reference to the accompanying drawings, of which.

DETAILED DESCRIPTION

Edge computing devices such as mobile telephones, tablet computers and the like are increasingly being provided with artificial neural network (ANN) based inference systems, to detect and classify user activity, such as a user uttering a spoken command to trigger some function of the device. Such systems must include an element of always-on processing, in order to be able to detect the user activity when it occurs. However, such always-on processing imposes a significant processing and power burden on the device, which may be undesirable particularly in small form-factor battery powered devices such as mobile telephones.

Figure 1A:
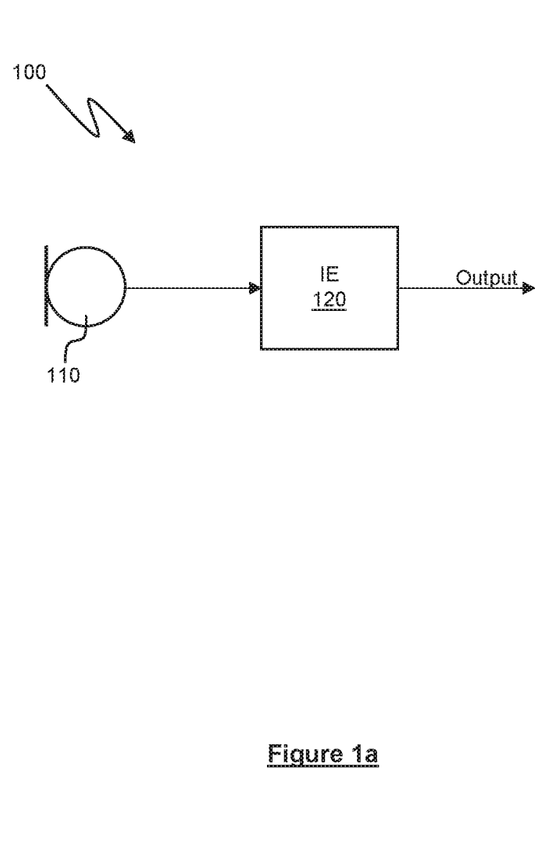
FIGS. 1a and 1b are simplified schematic representations of inference systems for processing data output by an input device.

FIG. 1a schematically illustrates one approach to activity detection in an edge computing device. As shown in FIG. 1a, an ANN based computing system 100 that may be included in a host device such as a mobile telephone or the like includes an input device 110, which in this example is shown as a microphone device, for detecting user activity such as a spoken command. An output of the input device 110 is coupled to an input of an inference engine 120, which receives data output by the input device 110 and performs inference to determine whether the data output by the input device 110 represents a signal or feature of interest such as a user command and, if so, what the data represents, e.g. which user command is represented by the signal. The inference engine 120 outputs an appropriate signal to downstream processing circuitry of the host device, which processes the signal to cause the host device to perform the desired action.

In the system 100 of FIG. 1a the inference engine 120 is always on, i.e. it continuously receives power and continuously processes a signal output by the input device 110. As will be appreciated, although this arrangement provides very good performance in terms of detection and subsequent processing of user activity, it requires significant processing power and, because the inference engine 120 is always on, has very high power consumption.

Figure 1B:
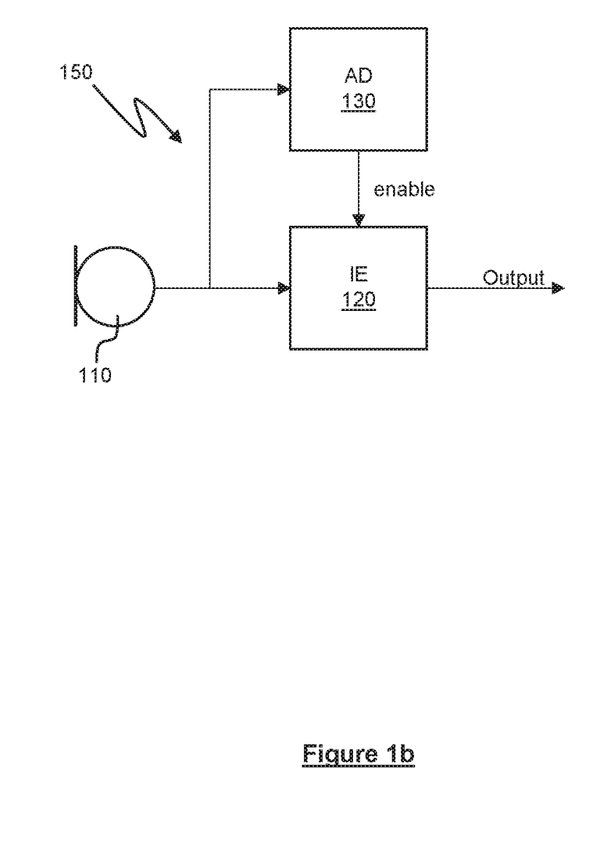

FIG. 1b schematically illustrates an alternative approach. The system 150 of FIG. 1b is similar to the system 100 of FIG. 1a, so like reference numerals refer to like elements in FIGS. 1a and 1b. In the system of FIG. 1b an activity detector 130 is provided, which receives data output by the input device 110 and processes this data to detect whether the data represents a signal of interest, e.g. intentional user activity such as a spoken command. If the activity detector 130 determines that data output by the input device 110 does represent intentional user activity, it issues a signal ("enable") to the inference engine 120 to wake, activate or enable the inference engine 120, which can then perform inference on the received data to determine whether the data output by the input device does indeed represent a signal of interest such as a user command and, if so, what the data represents, e.g. which user command is represented by the data. The inference engine 120 outputs an appropriate signal to downstream processing circuitry of the host device, which processes the signal to cause the host device to perform the desired action.

Thus, in the system 150 of FIG. 1b the inference engine 120 is not always powered on, so the power consumption of the system 150 is reduced in comparison to the system 100 of FIG. 1a. However, the performance of the system 150 is dominated by the performance of the activity detector 130, in the sense that the activity detector 130 must be able to accurately and reliably to detect intentional user activity and to wake, enable or activate the inference engine 120 quickly in response to detection of such intentional user activity. An activity detector 130 of sufficiently high performance can impose onerous memory and processing power requirements. For example, where the system 150 is to be used for speech processing, a high performance activity detector 130 may require hundreds of MIPS (millions of instructions per second).

Thus, a desire exists to balance the requirements for high performance of an ANN system with low power consumption in an edge device such as a mobile telephone.

Figure 2:
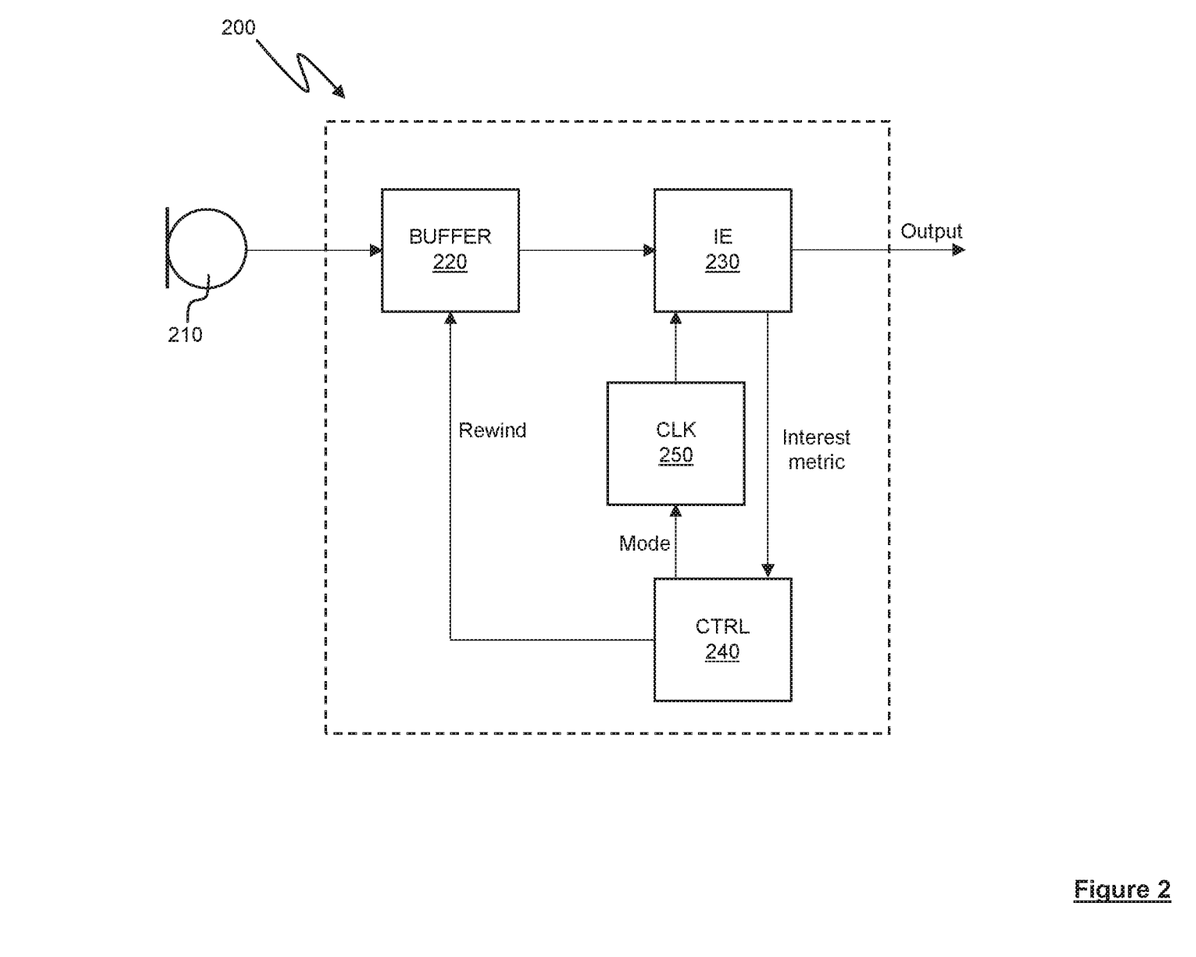
FIG. 2 is a simplified schematic representation of an artificial neural network (ANN) computing system according to embodiments of the present invention.

Referring now to FIG. 2, an ANN based computing system that may be included in a host device such as a mobile telephone or the like is shown generally at 200. The host device includes an input device 210, which in this example is shown as a microphone device, for detecting user activity such as a spoken command. As will be appreciated by those skilled in the art, the input device 210 may equally be any other input device suitable for detecting user activity. A buffer 220 of the ANN based computing system 200 is coupled to the input device 210, and receives data indicative of data output by the input device 210. This data may be, for example, data output by the input device 210, e.g. samples of sound detected by the input device 210, or may be data derived from the data output by the input device 210, e.g. data representing features of the data output by the input device 210, or may comprise both data output by the input device 210 and data derived from the data output by the input device 210. The received data may be stored in temporal order in the buffer 220 (i.e. each frame of data received from the input device 210 is stored in the buffer 220 in the order in which it was received), or alternatively each frame of data received by the buffer 220 may be associated with a timestamp indicative of the time at which that frame was received by the buffer 220.

An inference engine 230 receives data (e.g. data frames) from the buffer 220 and, in a first mode of operation, processes the received data to generate an "interest" metric, indicative of whether the data (e.g. one or more data frames) received by the inference engine 230 at a given point in time or within a given period of time are likely to represent a signal of interest. The "interest" metric may be, for example, a score (e.g. a numerical score) associated with or derived from the data that is received by the inference engine 230. Alternatively the interest metric may be generated by performing statistical analysis on an output of the inference engine. For example, the interest metric may be a statistical measure generated by performing statistical analysis on outputs of a given layer of an artificial neural network implemented by the inference engine 230, to determine or calculate a statistical measure such as a range of the outputs of the layer, a mean or average of the outputs of the layer, a median or mode of the outputs of the layer, or a trimmed mean of the outputs of the layer, for example.

The data may represent a signal of interest if it represents an intentional user input such as a spoken command uttered by a user of the host device to cause the host device to take some action, for example. Thus, the "interest" metric may be indicative of the likelihood that the data represents an intentional user input such as a spoken user command, for example.

In this first mode of operation the interference engine 230 does not receive all of the buffered data from the buffer 220, but instead receives only a subset of the buffered data, to reduce the amount of data that must be processed by the inference engine 210 to generate the interest metric.

A controller 240 is coupled to the inference engine 230 to receive the interest metric. The controller 240 is operative to control a mode of operation of the inference engine according to the interest metric.

For example, the controller 240 may issue appropriate control signals to the inference engine 230 in order to control directly the mode of operation of the inference engine 230.

Alternatively, the controller 240 may be operative to control the mode of operation of the inference engine 230 indirectly, based on the interest metric. For example, the controller 240 may be operative to issue control signals to control the frequency of a clock signal output by a clock signal generator 250 which supplies a clock signal to the inference engine 230. By increasing the clock frequency the inference engine 230 can be made to run more quickly, i.e. its mode of operation can be adjusted from a relatively lower speed, but lower power consumption, mode of operation to a relatively higher speed, higher power consumption mode of operation.

The controller 240 may be operative to compare the interest metric to one or more thresholds, and to output one or more control signals to adjust the mode of operation of the inference engine 230 based on the result of the comparison. For example, if the interest metric meets or exceeds a first predefined threshold value, the controller 240 may output a control signal (e.g. to the inference engine 230 or to the clock signal generator 250) to cause the mode of operation of the inference engine 230 to change.

In addition to outputting a control signal to cause the mode of operation of the inference engine 230 to change, the controller 240 is also operative to output a control signal to cause the inference engine 230 to process data from the buffer 220 from or associated with a predetermined period of time prior to the given point or period in time for which the interest metric was generated.

Thus, the controller 240 may issue a control signal (labelled "Rewind" in FIG. 2) to the buffer 220 to cause the buffer to transmit buffered data frames from or associated with the predetermined prior period of time to the inference engine 230 for processing by the inference engine 230 when its operating mode has changed from the first mode of operation.

Alternatively, the controller 240 may issue a control signal to the inference engine 230 to cause the inference engine 230 to retrieve buffered data from or associated with the predetermined prior period of time from the buffer 220 for processing by the inference engine 230 when its operating mode has changed from the first mode of operation.

Once the operating mode of the inference engine 230 has changed from the first mode, and the buffered data from or associated with the predetermined earlier period of time has been received by the inference engine 230, the inference engine 230 performs inference on the received data associated with the predetermined prior period of time to determine if the buffered data associated with the predetermined prior period of time does indeed represent a signal of interest such as a spoken user command, and if so, classifies the signal of interest according to a predetermined classification, e.g. as a particular user command. The inference engine 230 then outputs an appropriate signal to downstream components or circuitry of the host device, which performs an appropriate action in response.

Following this processing of the buffered data associated with the predetermined prior period of time by the inference engine 230, the inference engine 230 returns to the first mode of operation, e.g. in response to a control signal issued by the controller 240.

Figure 3:
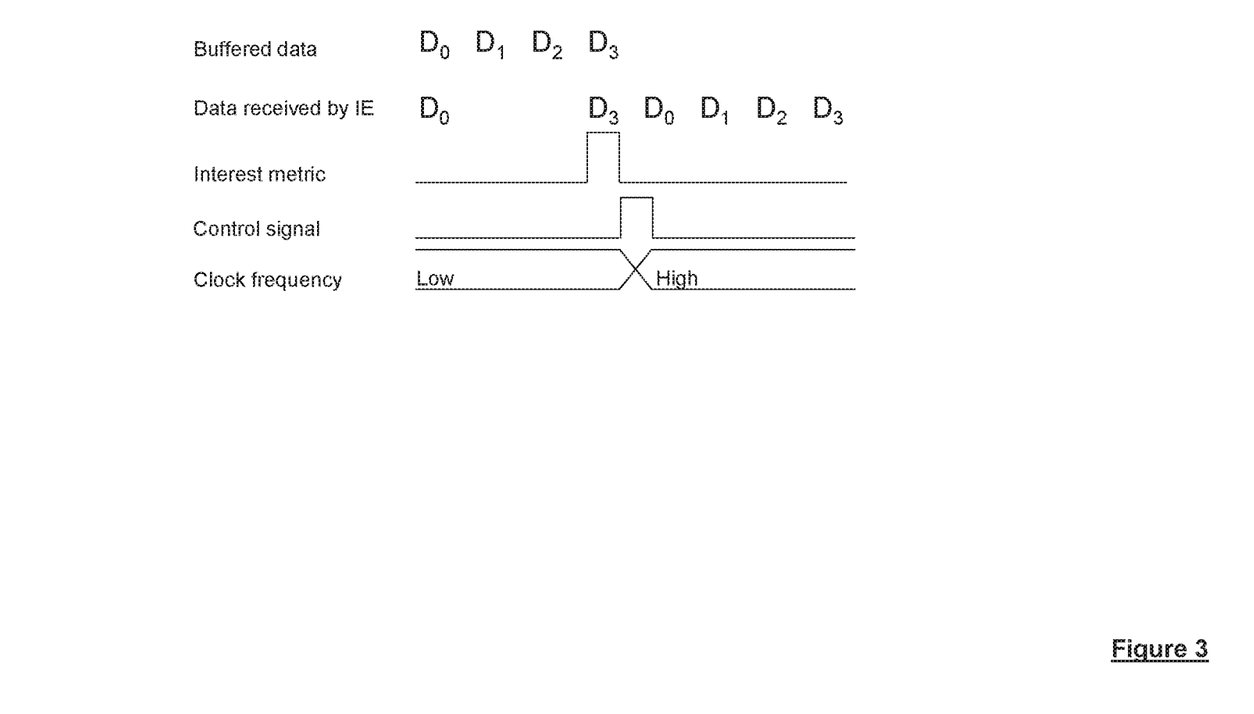
FIG. 3 schematically illustrates the operation of the ANN computing system of FIG. 2.

The operation of the system 200 is illustrated in FIG. 3, which shows data frames $D_0$, $D_1$, $D_2$, $D_3$ being received by the buffer 220 from the input device 210. As discussed above, in the first mode of operation the inference engine 220 receives a subset of the data stored in the buffer 210. In the example illustrated in FIG. 3 the inference engine receives every third data frame (e.g. the data frames $D_0$ and $D_3$). As indicated above, the "interest" metric may be, for example, a score (e.g. a numerical score) associated with or derived from the data that is received by the inference engine 230. Thus, for example, the interest metric may be a score associated with or derived from every third data frame. Alternatively, as discussed above, the interest metric may be a statistical measure generated by performing statistical analysis on an output of the inference engine. Thus, the interest metric may be generated by performing statistical analysis on outputs of a layer of the inference engine 230 for every third frame, for example.

The inference engine 220 processes the received data frames to determine an interest metric. As shown in FIG. 3, the interest metric generated by the inference engine 230 based on the received data frame D3 has a particular value which causes the controller 240 to issue a control signal to cause the mode of operation of the inference engine 230 to change. For example, the value of the interest metric may exceed the predetermined threshold value, causing the controller 204 to issue the control signal to change the mode of operation of the inference engine 230.

As discussed above, the change in the operating mode of the inference engine may be effected, for example, by changing the frequency of a clock signal provided by the clock signal generator 250 to increase from a relatively low frequency to a relatively higher frequency, as shown in FIG. 3.

The inference engine 230 may have distinct first and second modes of operation, in which case the change in the operating mode may be a change from the first mode of operation to the second mode of operation, effected, for example, by a change from a first, relatively lower clock frequency to a second, relatively higher, clock frequency.

Alternatively, the mode of operation of the inference engine may be variable over a range between first and second modes of operation, which are defined, respectively, by minimum and maximum values of the frequency of the clock signal generated by the clock signal generator 250.

Thus, a change in the mode of operation of the inference engine 230 may be a change from a defined first mode of operation to a defined second mode of operation, or may be a change to an intermediate operating mode between the first operating mode (defined by the minimum value of the frequency of the clock signal) and the second operating mode (defined by the maximum value of the frequency of the clock signal).

The rate of generation of data frames (containing either "raw" data or processed data frames containing feature data) generated by the input device 210 and input to the buffer 220 remains constant. Thus, while the inference engine 230 is operating in the second mode of operation, or in an intermediate mode of operation, new data frames are being added to the buffer 220. In order to ensure that signals or features of interest are not overlooked once the inference engine 230 returns to the first mode of operation following processing of data of interest in the second or intermediate mode of operation, the inference engine 230 must process the data that has accumulated in the buffer 220.

In one approach the inference engine 230 may select and process the most recent of this accumulated data, e.g. by processing a predefined number of data frames that were most recently received in the buffer 220. However, this approach risks missing features or signals of interest that may be present in or represented by a portion of the accumulated data that is not selected as being the most recent.

Accordingly, in an alternative approach the inference engine 230 may perform a statistical analysis of the data that has accumulated in the buffer 220 to generate the interest metric for the accumulated data, and if the interest metric so generated for the accumulated data is indicative of a signal or feature of interest, the inference engine 230 may, in the second mode or an intermediate mode, perform inference on the accumulated data (or on the result of the statistical analysis of the data) to identify and classify the signal or feature of interest. For example, the inference engine may calculate one or more of: a range of the accumulated data; a mean or average value of the accumulated data; a median value of the accumulated data; a mode value of the accumulated data; or a trimmed mean value of the accumulated data.

As a further alternative, the most "interesting" of the accumulated data may be processed by the inference engine to generate an interest metric. The most interesting of the accumulated data may be, for example, the data frame or frames that contain the features with the greatest magnitude, or the features with the greatest variance from, for example, an average magnitude or some other statistical measure (e.g. median, mode, trimmed mean etc.) of magnitude.

Figure 4:
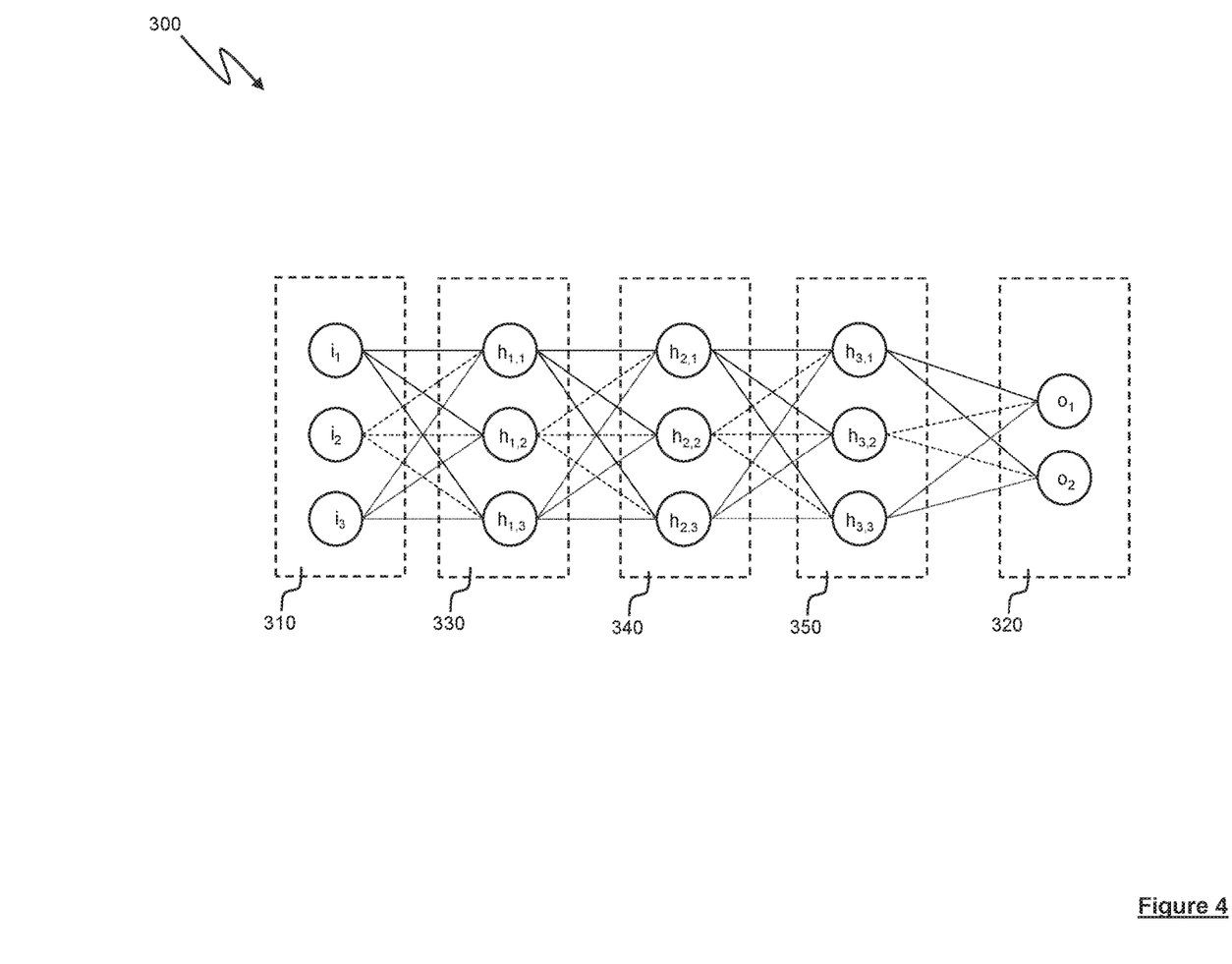
FIG. 4 is a schematic representation of an artificial neural network that may be implemented by an inference engine in the ANN computing system illustrated in FIG. 2.

The inference engine 230 may be configured to implement a multi-layer artificial neural network (ANN) of the kind shown generally at 300 in FIG. 4.

The ANN 300 of FIG. 4 includes an input layer 310, an output layer 320 and first, second and third intermediate or hidden layers 330, 340, 350. Each of the layers comprises a plurality of nodes, and each node is connected to the nodes of each predecessor layer and each successor layer by data connections.

In the first mode of operation the inference engine 230 may be operative to generate the interest metric (e.g. a numerical score or a statistical measure such as range, mean, trimmed mean, median or mode) using only a first subset of the layers 310, 320, 330, 340, 350 of the ANN 300. For example, the inference engine 230 may use only the output layer 320 or may only use the input layer to generate the interest metric. Alternatively, the inference engine 230 may use the input layer 310 in combination with one or more of the intermediate layers 330, 340, 350. As a further alternative, the inference engine 230 may use one of the intermediate layers 330, 340, 350 or a combination of two or more of the intermediate layers 330, 340, 350 to generate the interest metric. As yet another alternative, a dedicated interest metric layer may be provided in the ANN 300 (e.g. intermediate layer 340 may be dedicated interest metric layer), and the inference engine 230 may use this dedicated interest metric layer to generate the interest metric. In a further alternative, the interest metric may be generated by applying an attentional layer to the output of any given layer 310, 32, 330, 340, 350 in the ANN 300 to produce a weighted version of the output of the layer for use as the interest metric.

As will be appreciated, using only a subset of the layers 310, 320, 330, 340, 350 of the ANN 300 to generate the interest metric can help to reduce the power consumption of the system 200, as those layers that are not used in the generation of the interest metric can be powered off or placed in a lower-power state (e.g. a standby state) when the inference engine 230 is in the first mode of operation.

When the operating mode of the inference engine 230 changes in order to process the buffered data to identify and classify a signal or feature of interest, the layer(s) of the ANN that are not used for generating the interest metric can be powered up or activated such that they can be used in the processing of the buffered data.

For example, where the inference engine 230 has distinct first and second modes of operation, in the first mode of operation only a subset of the layers 310, 320, 330, 340, 350 may be active to generate the interest metric. When the interest metric is indicative of a signal or feature of interest (e.g. the interest metric exceeds the first predefined threshold), all of the layers 310, 320, 330, 340, 350 may be activated to process the buffered data to identify and classify the signal of interest.

Where the inference engine 230 has a range of intermediate operating modes between the first and second operating modes as discussed above, the number of layers 310, 320, 330, 340, 350 of the ANN 300 that are activated may vary in the intermediate modes. For example, in a first intermediate mode of operation defined by a clock frequency that is higher than the minimum clock frequency used in the first mode but lower than a maximum clock frequency used in the second mode, a second subset of the layers 310, 320, 330, 340, 350 of the ANN 300, which includes more layers than the first subset but does not include all of the layers, may be activated to process the buffered data to identify and classify the signal or feature of interest.

Thus, a degree of activation of the ANN 300 can be altered based, for example, on the frequency of the clock signal supplied by the clock signal generator 250, which may in turn vary according to, for example, the value of the interest metric. For example, the interest metric may be compared to a plurality of different threshold values, and the frequency of the clock signal supplied by the clock signal generator 250, and hence the operating mode (first, second or intermediate) of the inference engine, may be selected according to which of the thresholds is/are exceeded by the interest metric.

Figure 5:
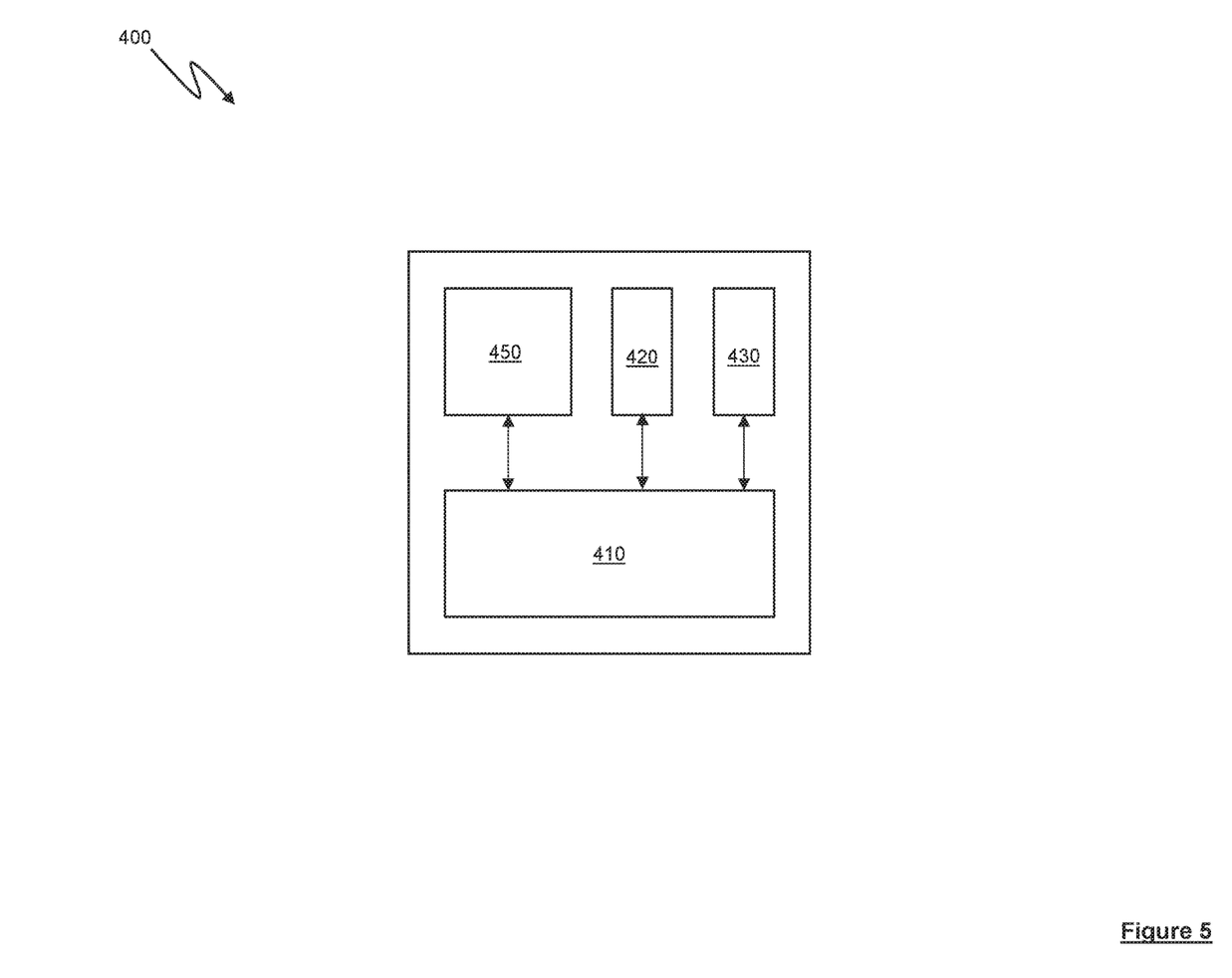
FIG. 5 is a schematic representation of a device incorporating an ANN computing system of the kind illustrated in FIG. 2.

FIG. 5 is a schematic representation of a device in which a processing system of the kind described above may be provided. The device, shown generally at 400 in FIG. 5, may be an edge device such as a mobile telephone, tablet or laptop computer, IoT device or the like. The device 400 includes a processing unit 410, embodied on one or more integrated circuits, which may be, for example, an application processor. The device further includes memory 420 communicatively coupled to the processing unit 410, and a communications subsystem 430 which is also communicatively coupled to the processing unit 410 to permit the device 400 to communicate with systems and devices external to the device 400. The device further includes an integrated circuit 450 that implements an ANN based computing system 200 of the kind described above with reference to FIG. 2. The integrated circuit 450 is communicatively coupled to the processing unit 410 for receiving input data from and transmitting output data to the processing unit 410.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. An artificial neural network (ANN) computing system configured to detect a user input at a user input device, the ANN computing system comprising:
an integrated circuit comprising:
a buffer configured to store data indicative of input data received from the input device;
an inference engine implementing an ANN, wherein the inference engine is selectively operable in a first mode and a second mode, wherein:
in the first mode, the inference engine is operative to process a subset of the input data from the buffer to generate an interest metric for the input data, wherein the interest metric is indicative of a likelihood that the subset of input data represents an intentional user input at the user input device; and
in the second mode, the inference engine is operative to:
perform inference on input data stored in the buffer to determine if the input data represents an intentional user input at the user input device; and
responsive to a determination that the input data represents an intentional user input, classify the user input according to a predetermined classification; and
a controller,
wherein the controller is operative to compare the interest metric to one or more thresholds and to output one or more control signals to control a mode of operation of the inference engine between the first mode and the second mode, by controlling an operating speed or frequency of the inference engine, based on a result of the comparison.

2. An ANN system according to claim 1, wherein the controller is operative to issue a first control signal to adjust the mode of operation of the inference engine if the interest metric exceeds a threshold.

3. An ANN system according to claim 1 wherein in the first mode of operation the inference engine is operative to generate the interest metric based on data from the buffer associated with a particular point or period in time.

4. An ANN system according to claim 2 wherein the controller is further operative to issue a second control signal to cause the inference engine to process data from the buffer associated with a predetermined period of time, prior to a point or period in time associated with the input data for which the interest metric was generated, if the interest metric exceeds the threshold.

5. An ANN system according to claim 3 wherein the inference engine implements a multi-layer artificial neural network and wherein:
in the first mode of operation the inference engine is operative to generate the interest metric based on data from the buffer using a subset of the layers of the multi-layer artificial neural network; and
in the second mode of operation the inference engine is operative to process data from the buffer using all of the layers of the multi-layer artificial neural network.

6. An ANN system according to claim 5 wherein the subset of layers comprises:
an output layer of the multi-layer artificial neural network; and/or
an input layer and/or one or more intermediate layers of the multi-layer artificial neural network; and/or
a dedicated interest metric layer of the multi-layer artificial neural network.

7. An ANN system according to claim 5 wherein the inference engine is operative to generate the interest metric by applying an attentional layer to the output of a layer of the multi-layer ANN.

8. An ANN system according to claim 1 wherein the interest metric comprises a score associated with or derived from a subset of the data from the buffer.

9. An ANN system according to claim 5 wherein the interest metric comprises a statistical measure of an output of a layer of the multi-layer artificial neural network.

10. An ANN system according to claim 1 wherein a power consumption of the ANN system in the first mode of operation is lower than a power consumption of the ANN system in the second mode of operation.

11. An ANN system according to claim 1 wherein in the first mode of operation the inference engine receives a first clock signal at a first frequency, and wherein in the second mode of operation the inference engine receives a second clock signal at a second frequency that is higher than the first frequency.

12. An ANN system according to claim 1 wherein the data indicative of input data received from an input device comprises data received from the input device or feature data derived from data received from the input device.

13. An ANN system according to claim 1 wherein the inference engine is further operable in one or more intermediate operating modes between the first operating mode and the second operating mode.

14. An ANN system according to claim 1 wherein the inference engine is operative, on returning to the first mode of operation, to:
process data most recently received in the buffer to generate an interest metric for input data accumulated in the buffer while the inference engine was not operating in the first mode; or
perform a statistical analysis of input data accumulated in the buffer while the inference engine was not operating in the first mode to generate an interest metric for the accumulated input data; or
determine the most interesting input data accumulated in the buffer while the inference engine was not operating in the first mode and to process the most interesting data to generate an interest metric for the accumulated input data.

15. An ANN system according to claim 14 wherein performing a statistical analysis of the input data comprises one or more of:
calculating a range of the input data;
calculating an average of the input data;

calculating a median of the input data;
calculating a mode of the input data; or
calculating a trimmed mean of the input data.

16. An artificial neural network (ANN) computing system comprising:
- an integrated circuit comprising:
  - a buffer configured to store data indicative of input data received from an input device;
  - an inference engine implementing an ANN operative to process data from the buffer;
  - a clock signal generator operative to generate a clock signal for the inference engine; and
  - a controller,
- wherein the controller is operative to compare an interest metric for the input data to one or more thresholds and to output one or more control signals to the clock signal generator to control the frequency of the clock signal generated by the clock signal generator according to a result of the comparison.

17. A device comprising an ANN system according to claim 1, wherein the device comprises a mobile telephone, a tablet or laptop computer or an Internet of Things (IoT) device.

* * * * *